(12) United States Patent
Aikoh

(10) Patent No.: US 12,235,862 B2
(45) Date of Patent: Feb. 25, 2025

(54) TIME SERIES PREDICTION METHOD FOR GRAPH STRUCTURE DATA

(71) Applicant: Hitachi, Ltd., Tokyo (JP)

(72) Inventor: Kazuhide Aikoh, Santa Clara, CA (US)

(73) Assignee: Hitachi, Ltd., Tokyo (JP)

( * ) Notice: Subject to any disclaimer, the term of this patent is extended or adjusted under 35 U.S.C. 154(b) by 11 days.

(21) Appl. No.: 17/558,458

(22) Filed: Dec. 21, 2021

(65) Prior Publication Data

US 2023/0195742 A1    Jun. 22, 2023

(51) Int. Cl.
*G06F 16/25* (2019.01)
*G06F 16/901* (2019.01)

(52) U.S. Cl.
CPC ........ *G06F 16/254* (2019.01); *G06F 16/9024* (2019.01)

(58) Field of Classification Search
CPC .......................... G06F 16/254; G06F 16/9024
See application file for complete search history.

(56) References Cited

U.S. PATENT DOCUMENTS

| | | | |
|---|---|---|---|
| 2019/0102462 A1* | 4/2019 | Botea | H04L 67/306 |
| 2019/0394654 A1* | 12/2019 | Gardner | H04W 40/22 |
| 2020/0004863 A1* | 1/2020 | Kumar | G06N 7/01 |
| 2020/0074999 A1* | 3/2020 | Elliott | G06F 16/9024 |
| 2020/0293564 A1* | 9/2020 | Reh | G06N 3/045 |
| 2021/0286790 A1* | 9/2021 | Lozi | G06F 16/212 |
| 2021/0398225 A1* | 12/2021 | Crabtree | G06Q 30/0611 |
| 2022/0207587 A1* | 6/2022 | Yang | G06F 16/9024 |

OTHER PUBLICATIONS

Grover, Aditya et al., "node2vec: Scalable Feature Learning for Networks," KDD '16, 2016, pp. 855-864.
Straka, Milan et al., "UFAL MRPipe at MRP 2019:UDPipe Goes Semantic in the Meaning Representation Parsing Shared Task," Charles University, Faculty of Mathematics and Physics, Institute of Formal and Applied Linguistic, Proceedings of the Shared Task on Cross-Framework Meaning Representation Parsing at the 2019 CONLL, 2019, pp. 127-137.

* cited by examiner

*Primary Examiner* — Courtney Harmon
(74) *Attorney, Agent, or Firm* — Procopio, Cory, Hargreaves & Savitch LLP

(57) ABSTRACT

Example implementations described herein are directed to systems and methods for selecting a prediction target node in creating a data flow. Systems and methods can involve a data flow editing interface, configured to, for receipt of an input node for an editing data flow in the data flow editing interface, determine a recommendation of a target node and a next node to be added to the data flow based on metadata, relevance of a data source for the data flow, location information of each node on the data flow, and similarity of the editing data flow to past flows that are previously executed data flows; and provide the recommendation of the target node and the next node on the data flow editing interface.

13 Claims, 15 Drawing Sheets

TIME SERIES PREDICTION METHOD FOR GRAPH STRUCTURE DATA

BACKGROUND

Field

The present disclosure is generally directed to databases and more specifically, for time series prediction for graph structure data in databases.

Related Art

Recently, low-code tools have been attracting attention due to lack of experts. In the field of data engineering, the Extract, Transfer, Load (L) tool corresponds to this low-code tool, and beginners can easily describe the data preparation logic in the data flow format using such tools.

In the field of integrated development environments (IDEs) and search engines, there is also a beginner work support technology that predicts the remaining input based on the user input character string and automatically completes it. However, when applying this auto-completion to ETL tools, it is necessary to automatically generate the graph structure.

In an example of a related art technique for automatically generating this graph structure, there is a related art implementation for the automatic generation method of semantic graph in natural language processing (NLP). Such related art implementations first break a sentence into words and considers it as a graph (a set of nodes). Secondly, such related art implementations use the NLP method to connect one semantic node to each node. Thirdly, the word dependencies are given as edges. The semantic graph is generated by repeating the addition of this semantic node and edge.

Here, there are two rules for the processing order of semantic graphs. First, the order for word nodes is from left to right. Second, the order of semantic nodes is determined by the order of creation. In other words, it processes in breadth-first order, and these rules are because sentences are generated and understood in left-to-right order.

SUMMARY

FIG. 1 illustrates an example data flow problem. When assembling the data flow step by step, it may not be possible to determine whether the prediction result is correct if the prediction order is incorrect. As shown in FIG. 1, consider a process in which a column with Data 2 is split, then joined with Data 1, and then joined with Data 3. As with the related art method as shown at 100, if the process is executed in breadth-first order (in this case, from top to bottom), Data1 and Data2 are joined first, which cannot be conducted because the identifiers (IDs) are different. In the example implementations described herein as shown at 110, the node to be predicted next is determined based on the past flow and the metadata information given to the data source. Thus, the data flow creation can be reduced, time can be saved, and correct next node can be predicted regardless of the user input order.

Accordingly, example implementations described herein define indicators for selecting the target node to be predicted. Depending on the desired implementation, the indicator can be calculated based on the completeness from past flows, and/or the complexity from metadata of data sources. The data feature can be calculated with metadata (e.g., data type, unit, statistics). The data feature can involve relationships between data (e.g., ID correspondence, unit correspondence)

Aspects of the present disclosure can involve a method for a data flow editing interface, the method involving, for receipt of an input node for an editing data flow in the data flow editing interface, determining a recommendation of a target node and a next node to be added to the data flow based on metadata, relevance of a data source for the data flow, location information of each node on the data flow, and similarity of the editing data flow to past flows that are previously executed data flows; and providing the recommendation of the target node and the next node on the data flow editing interface.

Aspects of the present disclosure can involve a computer program storing instructions for a data flow editing interface, the instructions involving, for receipt of an input node for an editing data flow in the data flow editing interface, determining a recommendation of a target node and a next node to be added to the data flow based on metadata, relevance of a data source for the data flow, location information of each node on the data flow, and similarity of the editing data flow to past flows that are previously executed data flows; and providing the recommendation of the target node and the next node on the data flow editing interface. The instructions can be stored on a non-transitory computer readable medium and executed by one or more processors.

Aspects of the present disclosure can involve a system for a data flow editing interface, the system involving, for receipt of an input node for an editing data flow in the data flow editing interface, means for determining a recommendation of a target node and a next node to be added to the data flow based on metadata, relevance of a data source for the data flow, location information of each node on the data flow, and similarity of the editing data flow to past flows that are previously executed data flows: and means for providing the recommendation of the target node and the next node on the data flow editing interface.

Aspects of the present disclosure can involve an apparatus for a data flow editing interface, the apparatus involving a processor, configured to, for receipt of an input node for an editing data flow in the data flow editing interface, determine a recommendation of a target node and a next node to be added to the data flow based on metadata, relevance of a data source for the data flow, location information of each node on the data flow, and similarity of the editing data flow to past flows that are previously executed data flows; and provide the recommendation of the target node and the next node on the data flow editing interface.

DETAILED DESCRIPTION

Figure 1:
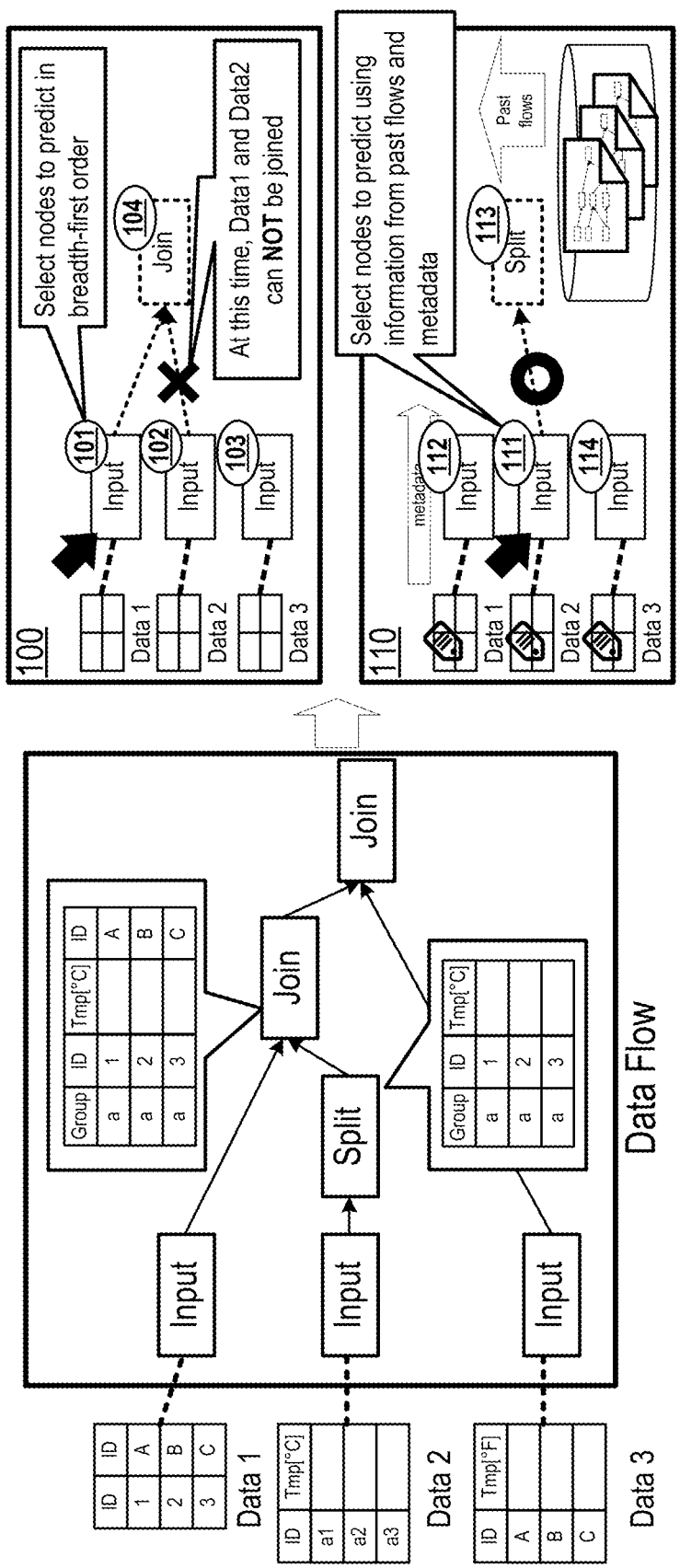
FIG. 1 illustrates an example data flow problem.

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

Figure 2:
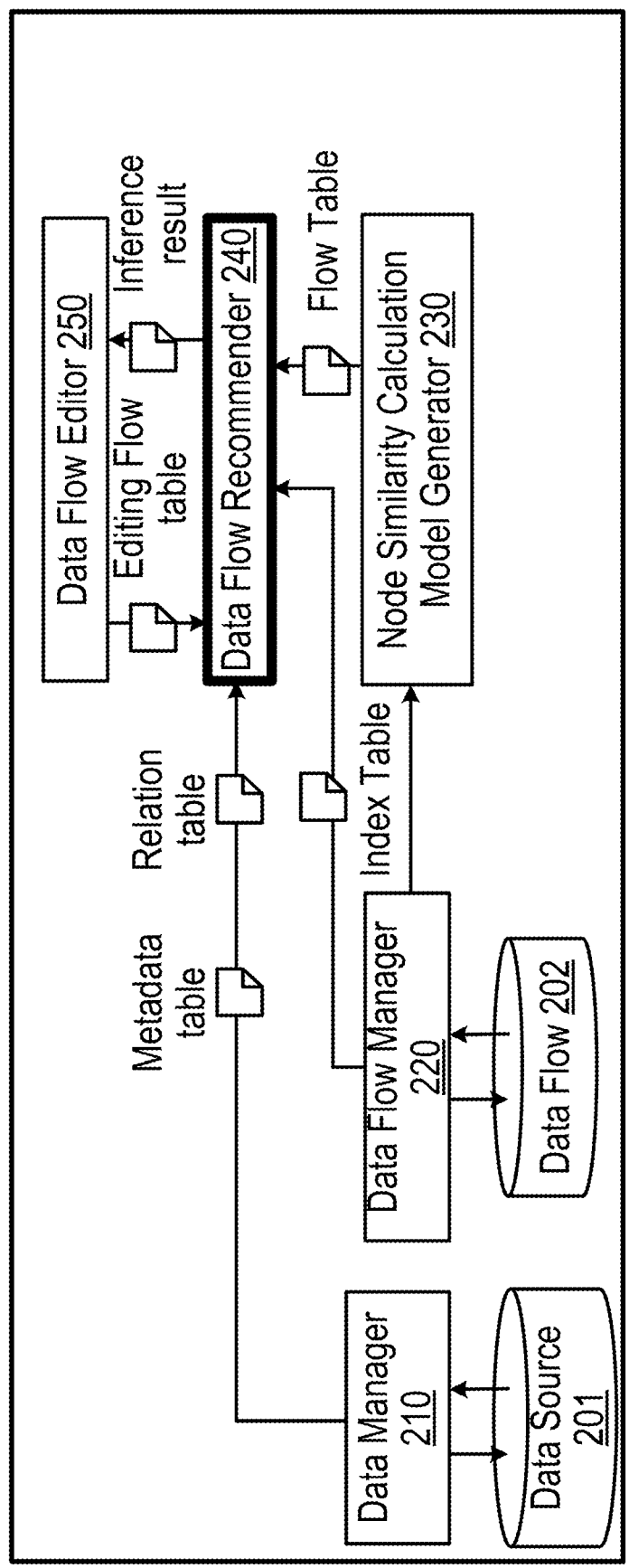
FIG. 2 shows the overall architecture, in accordance with an example implementation.

FIG. 2 shows the overall architecture, in accordance with an example implementation. In the architecture illustrated in FIG. 2, the data manager 210 manages data sources 201, the data flow manager 220 manages data flows 202, the node similarity calculation model generator 230 analyzes the structure of data flows, the data flow editor 250 provides user data flow editing screens, and the data flow recommender 240 automatically predicts the next nodes of the data flow based on the information from these components.

Figure 3:
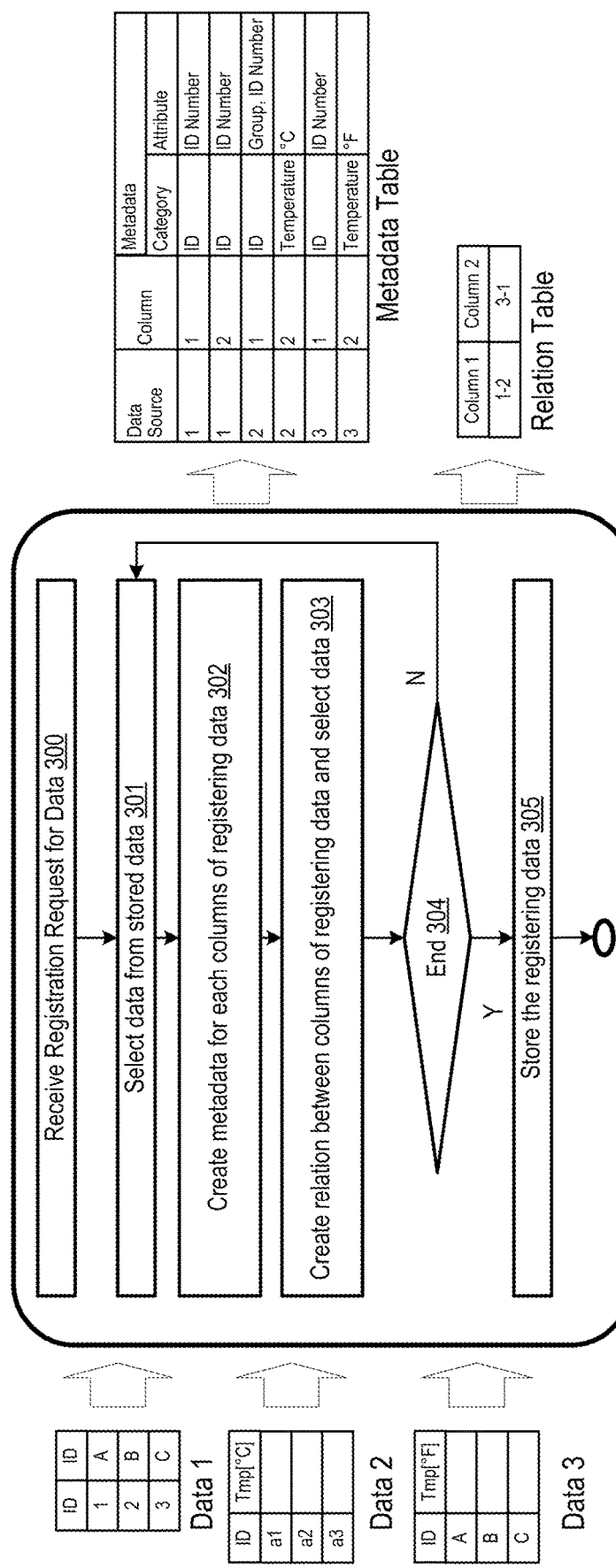
FIG. 3 illustrates the data manager, in accordance with an example implementation.

FIG. 3 illustrates the data manager 210, in accordance with an example implementation. In FIG. 3, when the data manager 210 receives a registration request for the data 300, the data manager 210 receives the data source information from selecting one data from the stored data at 301, and parses the information in each column and generates a metadata table at 302. This metadata table includes the category and attribute information for the values in each column (e.g., the employee number in the ID category and the ° C. in the temperature category). Note that such metadata may be automatically determined by artificial intelligence (AI) algorithms or may be determined based on a rule input in advance by the user, depending on the desired implementation. The metadata can involve categories and attributes associated as features for each column for the data source as shown in the metadata table, and a correspondence of columns that have a foreign key relationship between data sources/tables as shown in the relation table.

Next, the correspondence between the tables of the data source is analyzed and the relation table is generated at 303. This relation table involves information for determining whether a join or union can be created between tables. For example, in the example of FIG. 3, the second column of Data 1 and the first column of Data 3 correspond to each other. Note that this correspondence involves not only the matching of values, but also conditions such as whether the relationship is a primary key or a compound key, and whether the domain of values is aligned may be added. At 304, a determination is made as to whether all data is parsed. If not (No) then the flow goes back to 301, otherwise (Yes), the flow proceeds to 305 to store the received data source in a storage device, database, and so on in accordance with the desired implementations.

Figure 4:
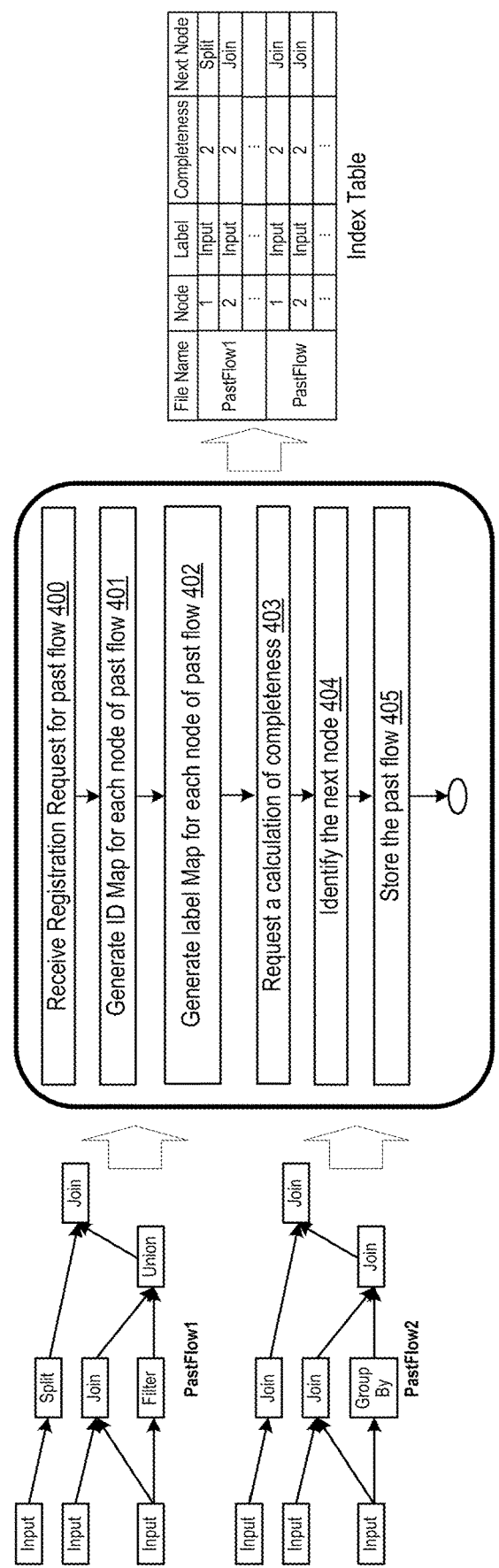
FIG. 4 illustrates the data flow manager, in accordance with an example implementation.

FIG. 4 illustrates the data flow manager, in accordance with an example implementation. At first, at 400, the data flow manager 220 receives the registration request for the past flows. At 401, the data flow manager 220 generates the identifier (ID) Map for each node of the past flow and a label map for each node of the past flow at 402. In this manner, the data flow manager 220 can generate the index table when it receives data flow information. This index table can manage the node identification number, what data processing is performed, completeness, and information regarding the next node.

At 403, the data flow manager 220 requests a calculation of completeness. To facilitate the calculation, the data flow manager 220 requests the data flow recommender to process the calculation. At 404, the data flow manager 220 identifies the next node, and then stores the past flow at 405. The past received data flow is stored in a storage device, or so on in accordance with the desired implementation. The flow table as output by the data flow manager 220 provides the information of each node on the data flow.

Figure 5:
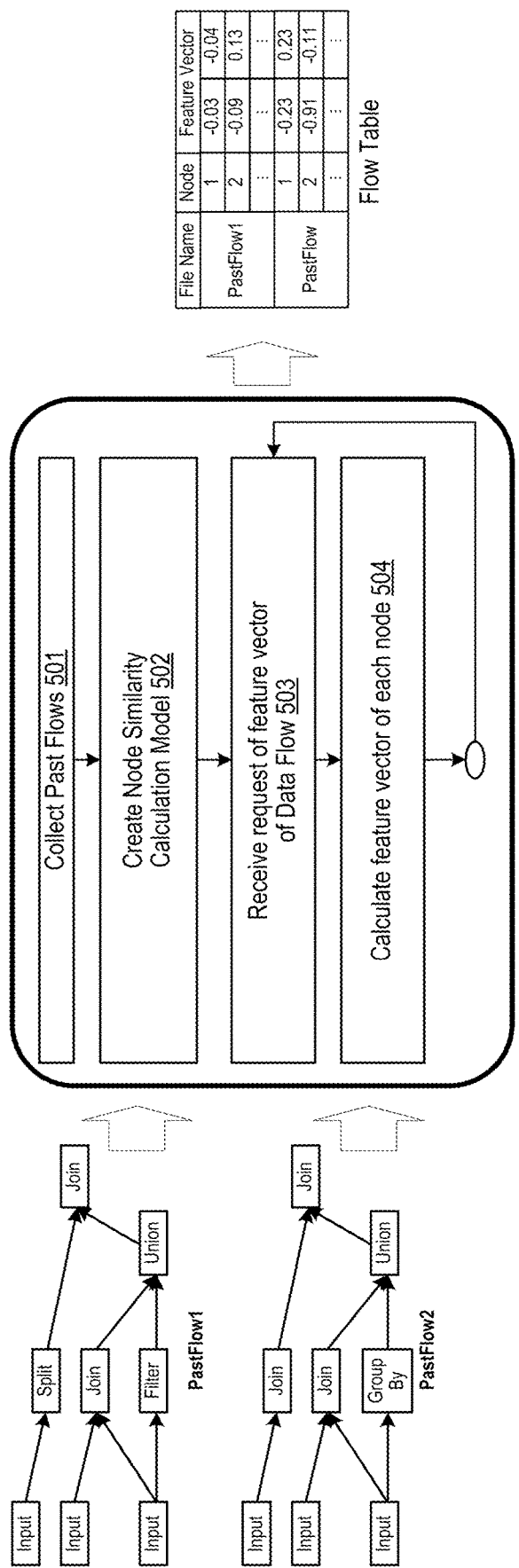
FIG. 5 illustrates an example of a node similarity calculation model generator, in accordance with an example implementation.

FIG. 5 illustrates an example of a node similarity calculation model generator 230, in accordance with an example implementation. After the past flows are collected at 501, as a preprocessing, a node similarity calculation model is generated using the information of the past flow that has already been stored at 502. For example, implementations such as Node2Vec can used as this node similarity calculation model; however, other implementations can also be utilize d in accordance with the desired implementation, and the present disclosure is not limited thereto.

Next at 504, each time a feature vector generation request is accepted at 503, a flow table is generated. This flow table stores the feature vector of each node. For example, when Node2vec is used, the node transition when each past flow is randomly walked, that is, each node is mapped to the embedding space based on the feature vector calculated by the similarity of the nodes that often appear in the surroundings. Thus, the vector value of each node obtained is used as the features.

Figure 6:
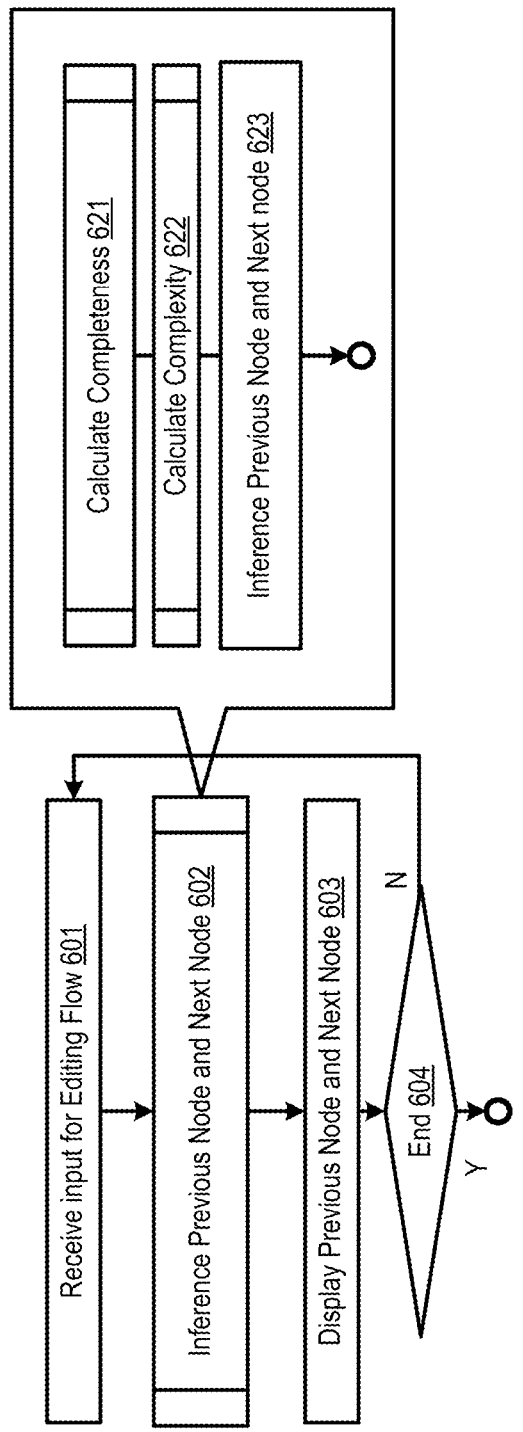
FIG. 6 illustrates a data flow recommender, in accordance with an example implementation.

FIG. 6 illustrates a data flow recommender 240, in accordance with an example implementation. In FIG. 6, When the data flow recommender 240 receives the editing flow input from the data flow editor at 601, it predicts the target node and next node at 602 and outputs the result to the data flow editor at 603. Here, the target node is a node to be predicted by the next node. To predict this target node, two indicators, completeness and complexity, are used. The completeness is a calculated metric from past flows, and the complexity is a calculated metric from metadata of the data source. The target node can be the previous node, or it can be another node that is unrelated to the input node depending on the desired implementation.

Thus, to facilitate the prediction, at 621 the completeness is calculated from past flows. Further detail of the calculation of completeness is described with respect to FIG. 7 and FIGS. 8(A) and 8(B). At 622, the complexity is calculated from the metadata of the data source. Further detail is provided with respect to FIG. 9 and FIGS. 10(A) and 10(B). At 623, the target node and the next node are thereby inferred based on the completeness and complexity calculations. The flow ends at 604.

In example variations, there can be an indicator that is calculated based on the completeness from past flows. Further, there can be a similar indicator that is calculated based on the complexity from the metadata of the data source. The data features can involve calculations with the metadata (e.g., data type, unit, statistics, etc.), or they can also include relationships between the data (e.g., ID correspondence, unit correspondence, etc.) in accordance with the desired implementation.

Figure 7:
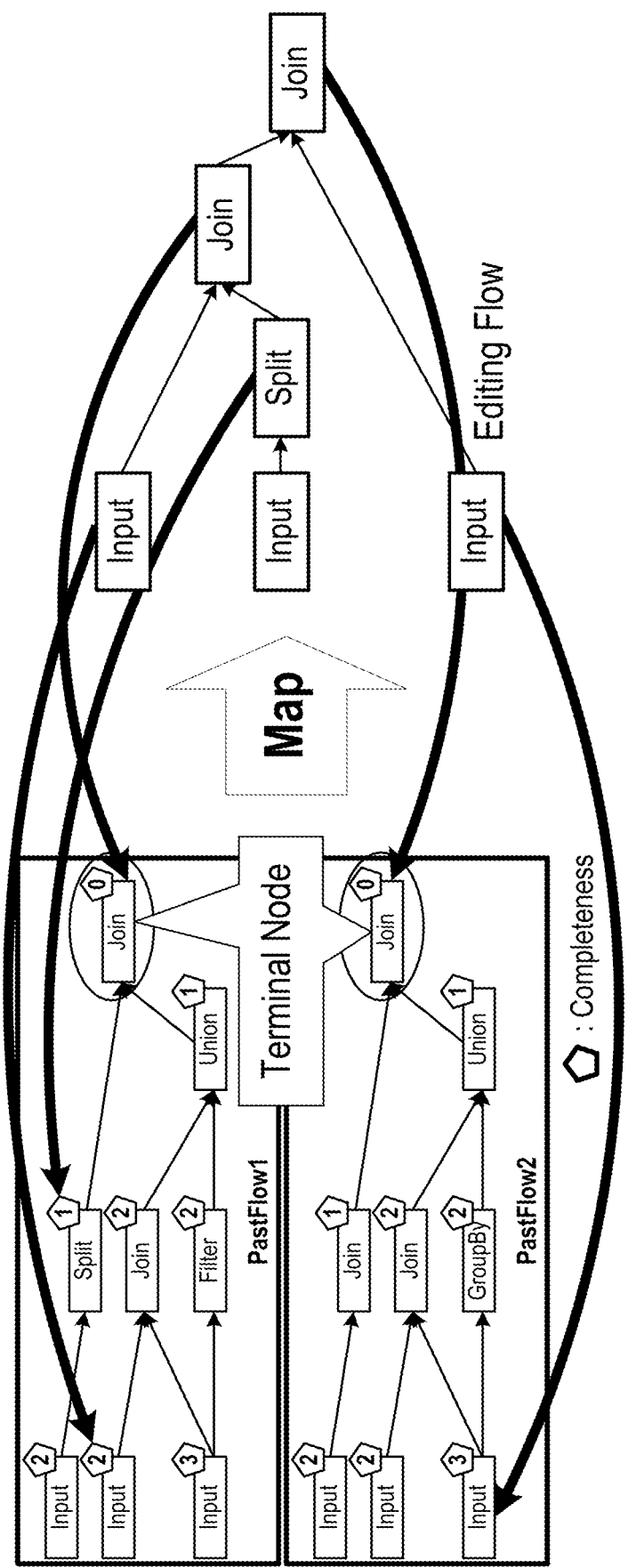
FIG. 7 illustrates an overview of how the completeness is calculated, in accordance with an example implementation.

FIG. 7 illustrates an overview of how the completeness is calculated, in accordance with an example implementation. Completeness is an index that is given to each node of the data flows, and is calculated by the distance from the terminal node. Completeness is mapped to the editing flow using the node similarity in the graph structure. The completeness calculation of the past flows is shown in the value in the pentagon icon according to the terminal node. The location information of each node on the data flow can be determined based on a distance from each of the nodes to a terminal node as described below.

Figure 8A:
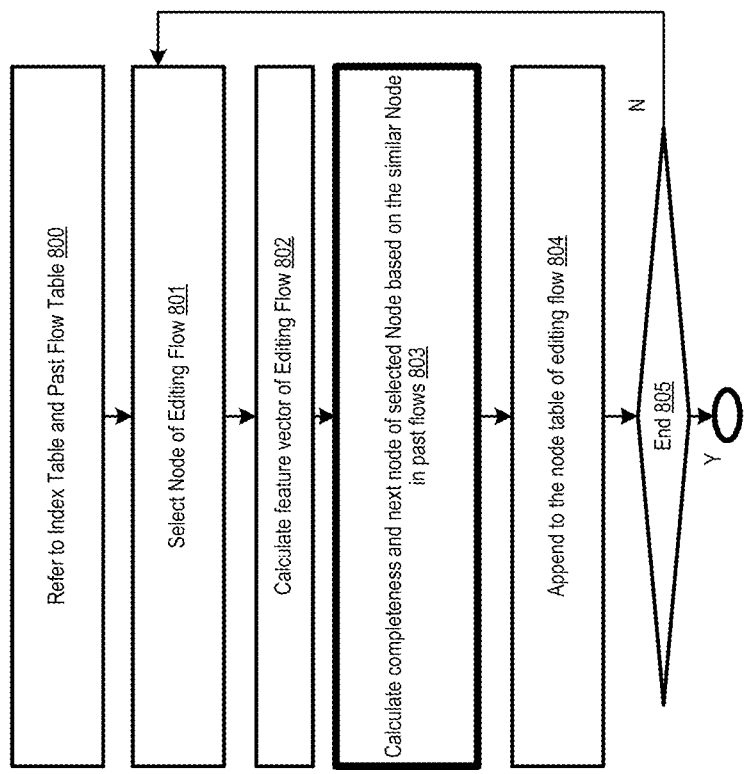
FIGS. 8(A) and 8(B) illustrates the calculation process of completeness, in accordance with an example implementation.
Figure 8B:
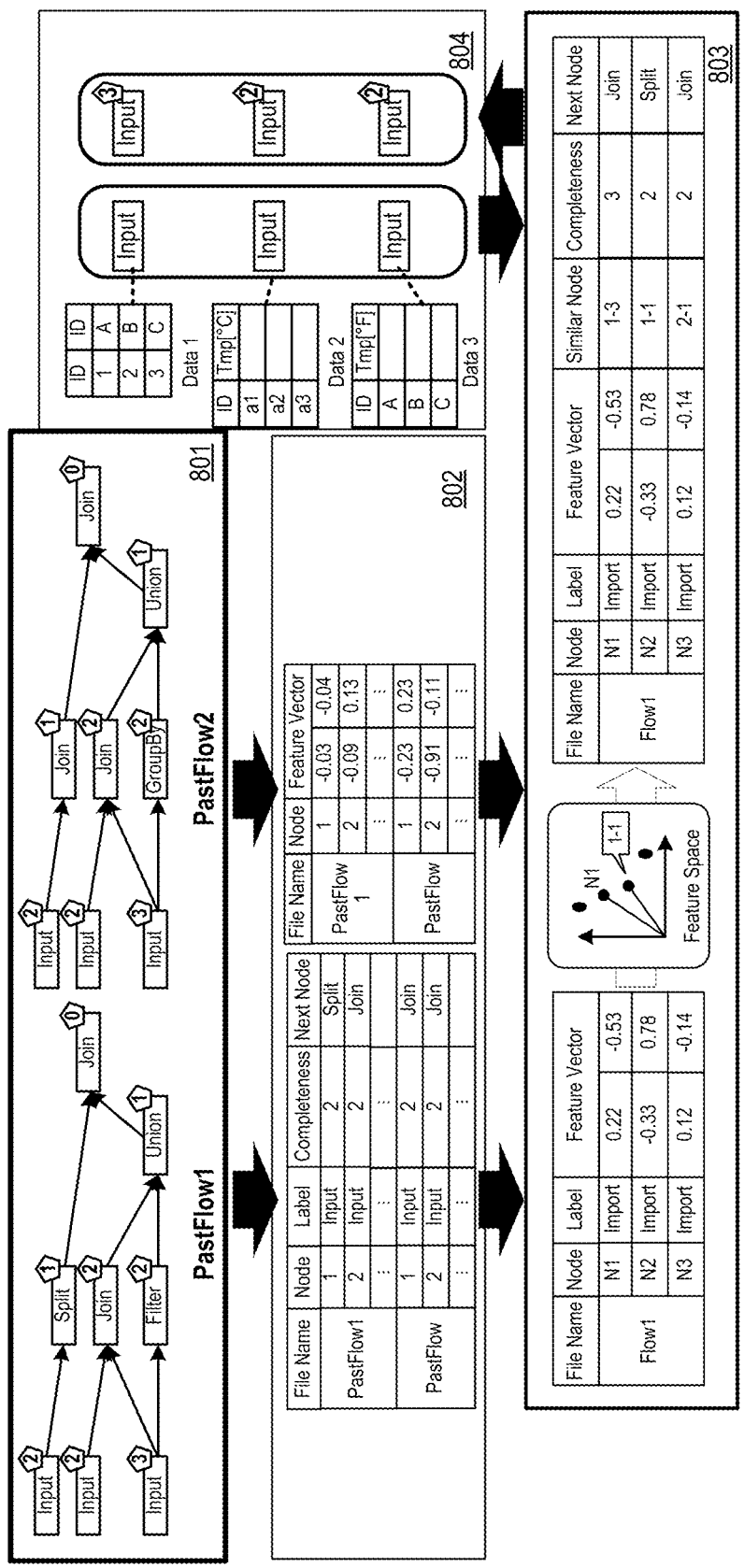

FIGS. 8(A) and 8(B) illustrates the calculation process of completeness, in accordance with an example implementation. As illustrated in FIG. 8(A), the data flow recommender 240 first refers to the past flow information at 800, that is, the flow table generated by the node similarity calculation model generator and the index table generated by the data flow manager 220. Next, at 801 the data flow recommender 240 obtains the feature vector of each node of the editing flow by sending the information regarding the editing flow to the node similarity calculation model generator 230. Then at 802, by calculating the cosine distance of the feature vector of each node, each node having the highest similarity in the past flow is identified. Although cosine distance is used to determine similarity, other distance measures can also be utilized and the present disclosure is not limited thereto. At 803, the completeness of the edit flow is calculated as the completeness and next node of similar nodes in the past flow. At 804, the completeness is appended to the node table of the editing flow. At 805, if there are more flows to process, then the process returns back to 801, otherwise the process ends.

Figure 9:
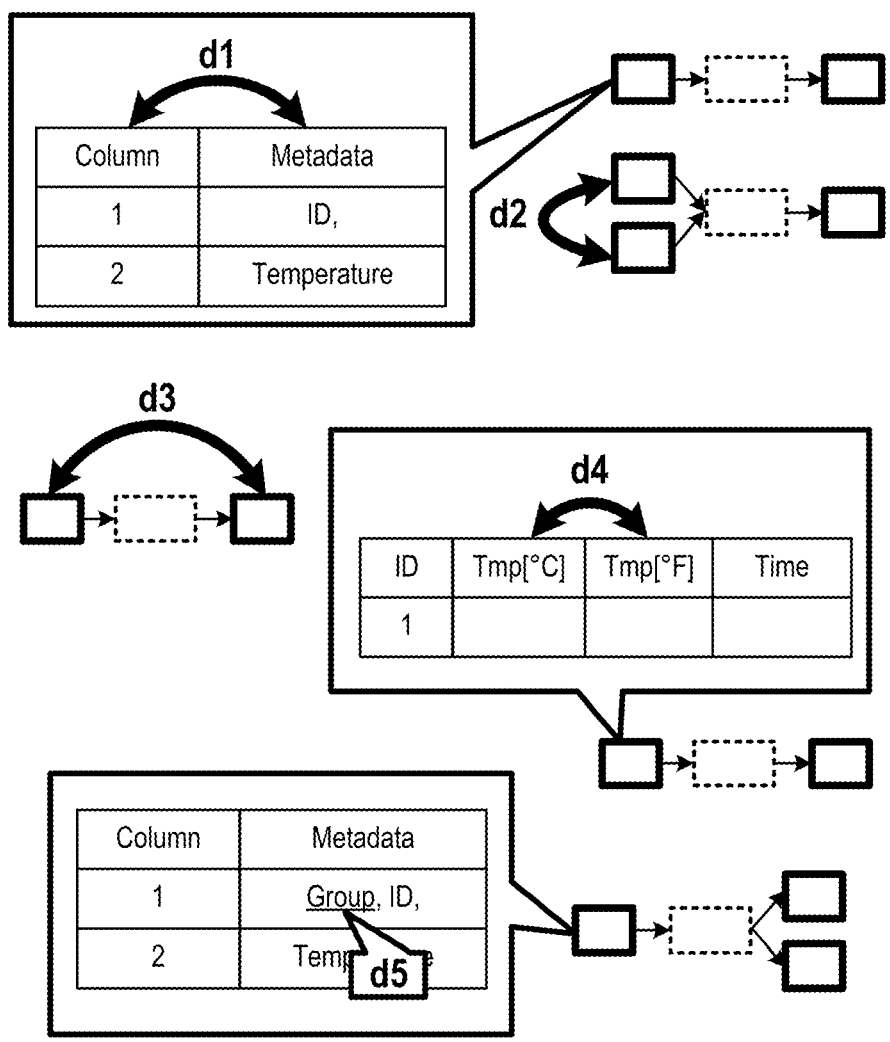
FIG. 9 illustrates an overview of how the complexity is calculated, in accordance with an example implementation.

FIG. 9 illustrates an overview of how the complexity is calculated, in accordance with an example implementation. The complexity is an indicator of how much processing each node needs. First, the ETL process is classified into various types based on the graph structure and the metadata used for the judgment. Then, the linear combination of those classifications is weighted in accordance with the desired implementation and set to be the complexity of each node in accordance with the formula herein.

$$\text{Complexity} = \left( \sum_{i=1}^{5} wi \times di \right)$$

In the example of FIG. 9, the curated table creation flow from the data source facilitates the data source complexity indicator and involves the following operations:

$$\text{Transform: } d1 = \frac{\text{Tags}(T)}{\text{Column}(T)}$$

d1 represents the number of tags attached to each column. The larger this value is, the more information is mixed and the more ETL operation may be required.

Join: $d2 = \Sum_{j=1}^{n} \text{hop}(T, Tj)$ d2 represents the number of mediate data, such as master tables, when data source T joins with another data source. The larger this value is, the more join operations may be required.

Further, there is a data mart complexity indicator from the data mart table creation flow, which involves the following operations:

Transform: $d3 = \text{Completeness}$ d3 represents the completeness of the node that imports each data source. The larger this value is, the more ETL operations may be required to process this table into a data mart.

Unify: $d4 = \Sum_{k=1}^{n} \text{Category\_Match}(T, Tk) - \text{Attribute\_Match}(T, Tk)$ d4 represents the amount of metadata in the same category but with different attributes for data source T. For example, in FIG. 3, Data 2 and Data 3 each have temperature category metadata, but with different attributes, ° C. and ° F., respectively. The larger the value, the more operations such as unit conversion and identity verification may be required.

Branch: $d5 = \text{Group}(T)$ d5 represents the amount of data source T metadata that belongs to the group category. The larger this value, the more operations such as Group-by and aggregation may be required.

Then, example implementations prioritize the index based on the phase [data source or data mart]. Finally, the value of w is determined as the weight of each classification. For example, for a standard process that cleanses and unifies all data as an internal rule, the weight of the classification used for integration is increased, and the weight of the classification used for mart creation is decreased to form the following:

$d1 > d4 > d5 > d3 > d2$

Alternatively, it may be determined using artificial intelligence, in accordance with the desired implementation.

Figure 10A:
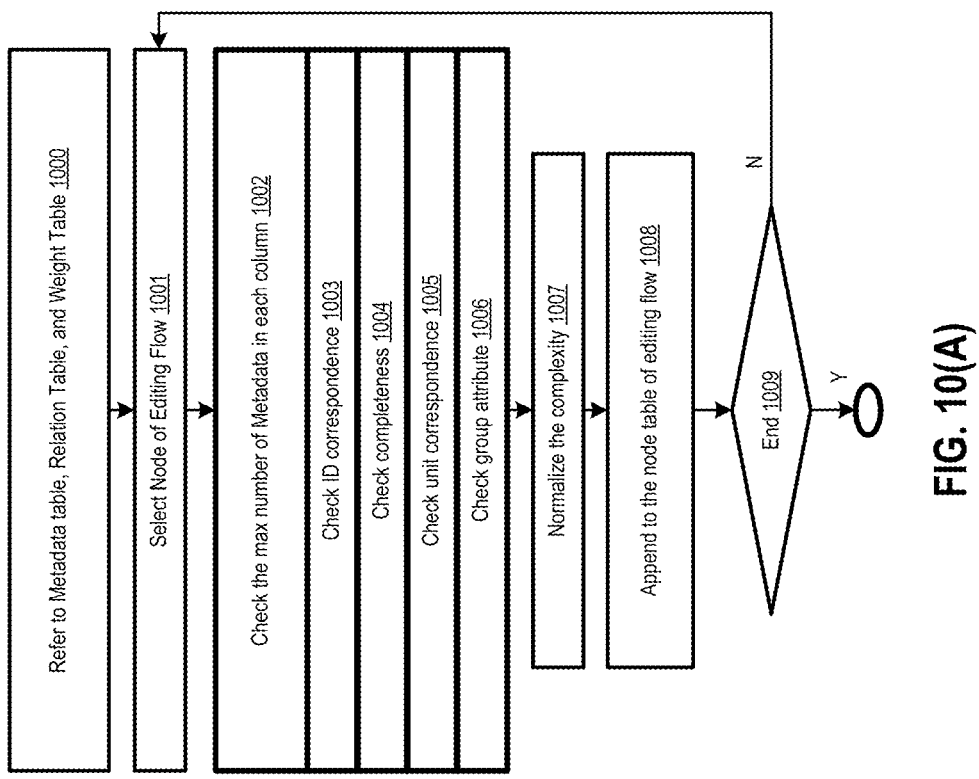
FIGS. 10(A) and 10(B) illustrate the calculation process for complexity, in accordance with an example implementation.
Figure 10B:
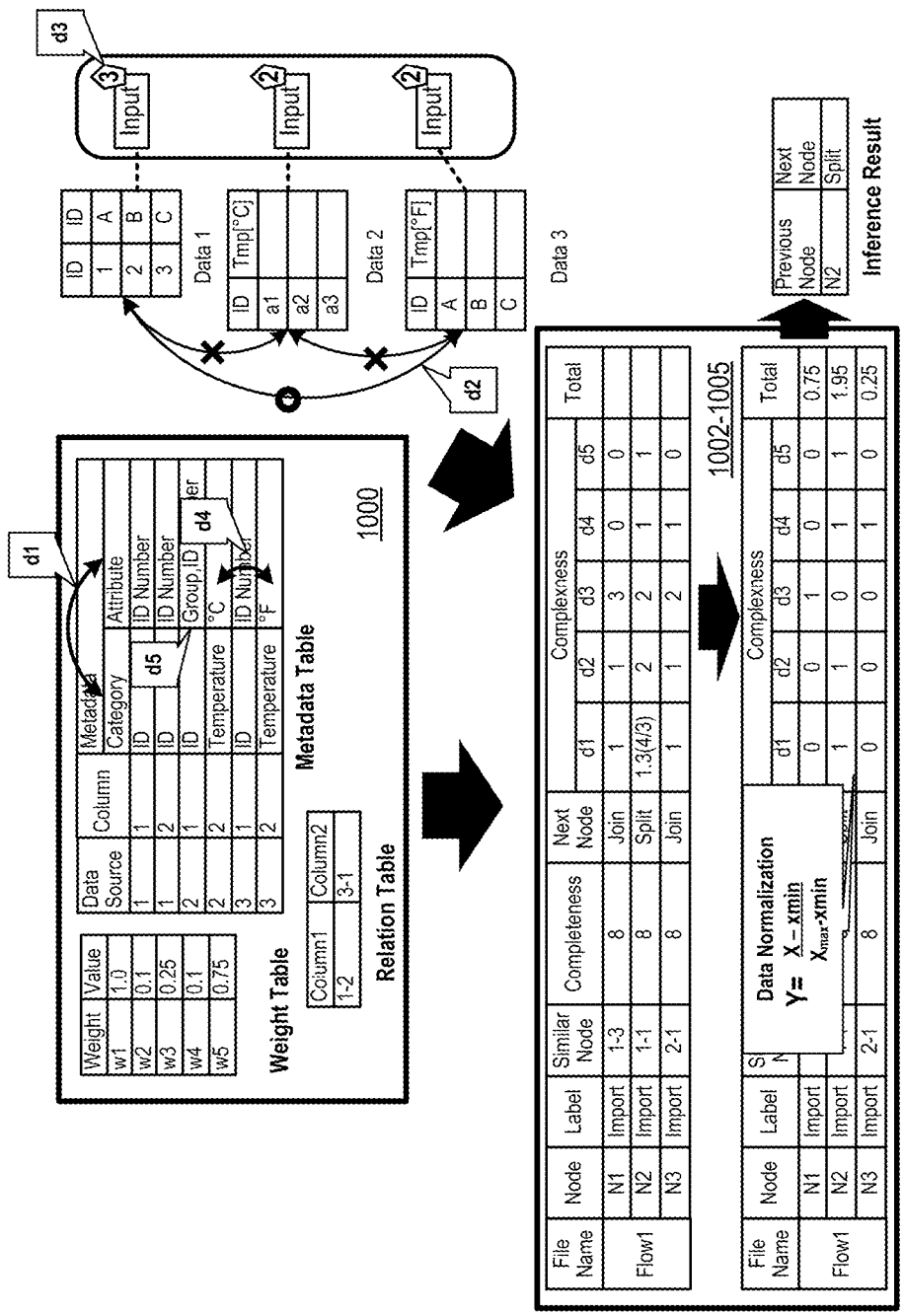

FIGS. 10(A) and 10(B) illustrate the calculation process for complexity, in accordance with an example implementation. The data flow recommender 240 first refers to the metadata table and relation table generated by the data manager 210 at 1000, as well as the weight table specified by the user. Then, the data flow recommender 240 selects the appropriate node for the editing flow at 1001, and proceeds to use the aforementioned classifications to check the number of Metadata of each column(d1) 1002, check ID correspondence(d2) 1003, check completeness(d3) 1004, check unit correspondence(d4) 1005, and check group attribute (d5) 1006. Then, after standardizing the values of each classification by the following formula at 1007, the total value of complexity is calculated based on the weights.

$$Y = \frac{X - x_{min}}{x_{max} - x_{min}}$$

Finally, the node with the largest total value is set as target node, and it is output together with next node and appended to the node table of the editing flow at 1008. If there are no more nodes to process at 1009, then the flow ends, otherwise, it proceeds back to 1001 to select the next appropriate node for the editing flow.

Figure 11:
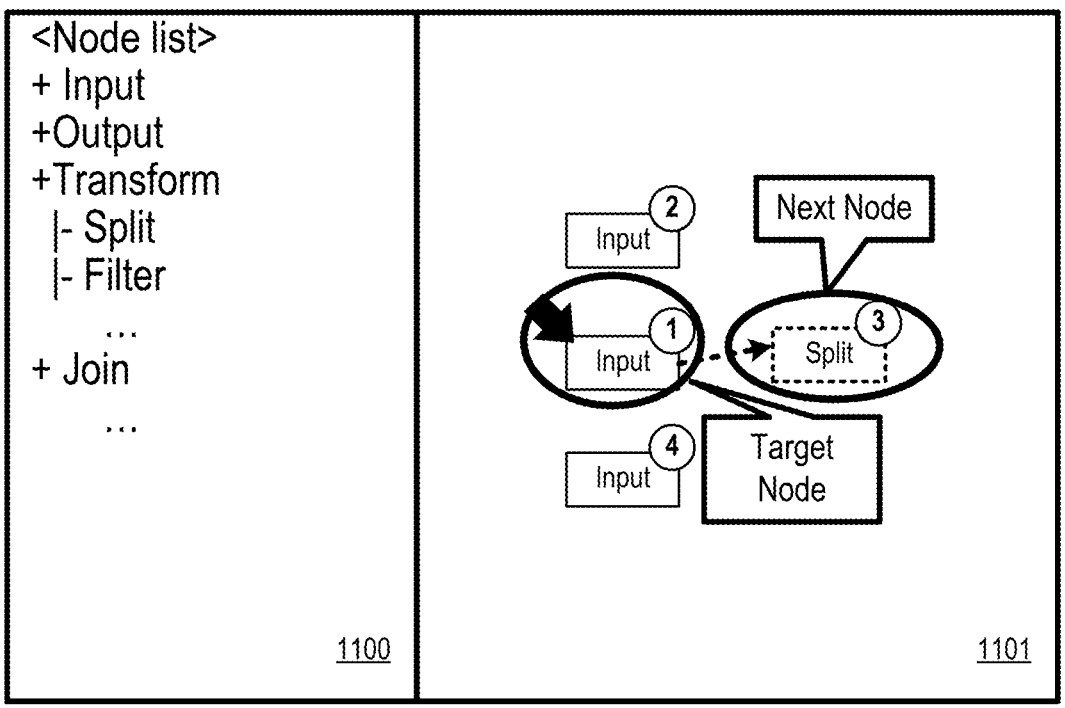
FIG. 11 illustrates a screen image of the flow editor, in accordance with an example implementation.

FIG. 11 illustrates a screen image of the data flow editor 250, in accordance with an example implementation. The flow editor has a node list pane 1100 and a flow pane 1101, and the user selects an ETL process from the node list pane 1100 and drag-and-drop it onto the flow pane 1101 to create a data flow. When the data flow editor 250 accepts a drag-and-drop operation by the user, it sends the data flow information on the flow pane to the data flow recommender 240, and displays the resulting target node and next node information in the flow pane 1101. The display method of the target node may be displayed in a balloon as shown in FIG. 10, or may be shown by connecting to the next node.

Through the example implementations described herein, it is possible to shorten the work time by suppressing the rework of data flow creation, while predicting the correct next node regardless of the user input order.

Figure 12:
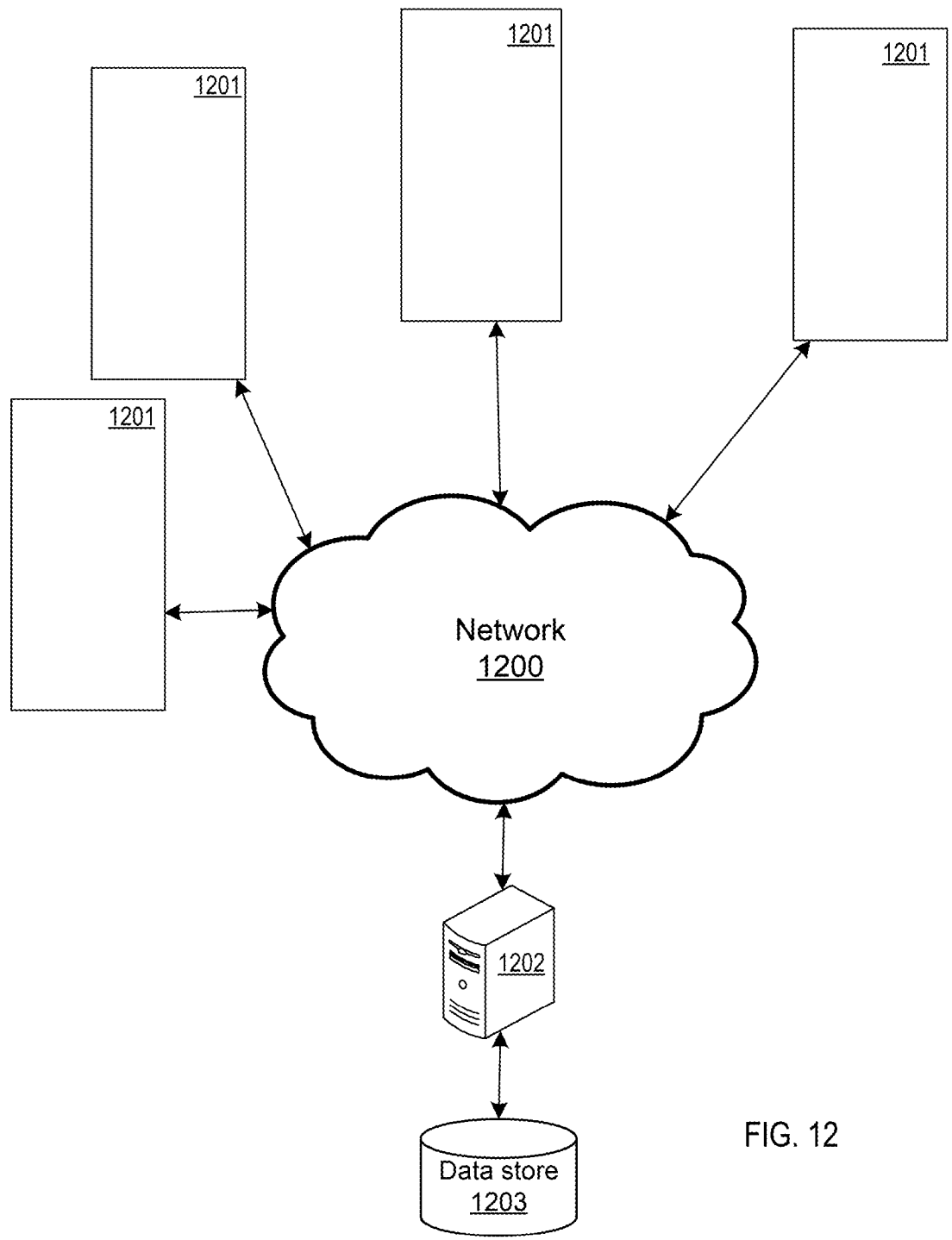
FIG. 12 illustrates a system involving a plurality of assets networked to a management apparatus, in accordance with an example implementation.

FIG. 12 illustrates a system involving a plurality of assets networked to a management apparatus, in accordance with an example implementation. (ne or more assets 1201 are communicatively coupled to a network 1200 (e.g., local area network (LAN), wide area network (WAN)) through the corresponding on-board computer or Internet of Things (IoT) device of the assets 1201, which is connected to a management apparatus 1202, The management apparatus 1202 manages a data store 1203, which holds data source 201 and data flow 202 as illustrated in FIG. 2 and can also contain sensor data and other date sources collected from the assets 1201. Management apparatus 1202 also facilitates remote control to each of the assets 1201. In alternate example implementations, the data from the assets can be stored to a central repository or central database such as proprietary databases that intake data, or systems such as enterprise resource planning systems, and the management apparatus 1202 can access or retrieve the data from the central repository or central database. Asset 1201 can involve any physical system in accordance with the desired implementation, such as but not limited to air compressors, lathes, and so on in accordance with the desired implementation. Assets 1201 can also include business systems that manage data sources, such as Enterprise Resource Planning (ERP) systems, customer relations hip management (CRM) systems, and so on. The data provided from the sensors of such assets 1201 can serve as the data flows as described herein upon which analytics can be conducted. Besides sensor data, other data can be incorporated from data sources, such as tables for managing parts ordered in an ERP system, or a customer list table in a CRM system.

Figure 13:
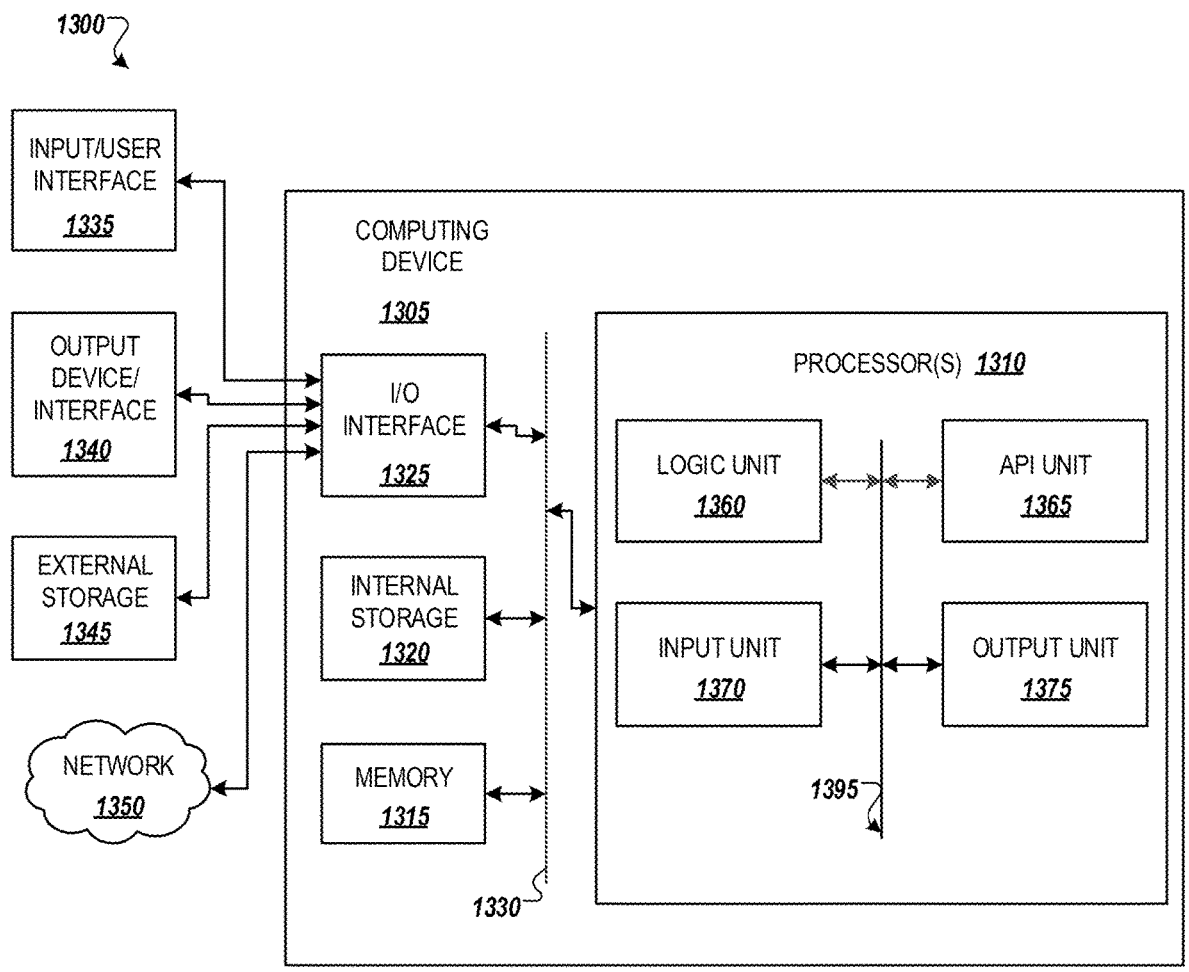
FIG. 13 illustrates an example computing environment with an example computer device suitable for use in some example implementations.

FIG. 13 illustrates an example computing environment with an example computer device suitable for use in some example implementations, such as a management apparatus 1202 as illustrated in FIG. 12, or as an on-board computer of an inspection system 1201. Computer device 1305 in computing environment 1300 can include one or more processing units, cores, or processors 1310, memory 1315 (e.g., RAM, ROM, and/or the like), internal storage 1320 (e.g., magnetic, optical, solid state storage, and/or organic), and/or I/O interface 1325, any of which can be coupled on a communication mechanism or bus 1330 for communicating information or embedded in the computer device 1305. I/O interface 1325 is also configured to receive images from cameras or provide images to projectors or displays, depending on the desired implementation.

Computer device 1305 can be communicatively coupled to input/user interface 1335 and output device/interface 1340. Either one or both of input/user interface 1335 and output device/interface 1340 can be a wired or wireless interface and can be detachable. Input/user interface 1335 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 1340 may include a display, television, monitor, printer, speaker, braille, or the like. In some example implementations, input/user interface 1335 and output device/interface 1340 can be embedded with or physically coupled to the computer device 1305. In other example implementations, other computer devices may function as or provide the functions of input/user interface 1335 and output device/interface 1340 for a computer device 1305.

Examples of computer device 1305 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 1305 can be communicatively coupled (e.g., via I/O interface 1325) to external storage 1345 and network 1350 for communicating with any number of networked components, devices, and systems, including one or more computer devices of the same or different configuration. Computer device 1305 or any connected computer device can be functioning as, providing services of, or referred to as a server, client, thin server, general machine, special-purpose machine, or another label.

I/O interface 1325 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected, components, devices, and network in computing environment 1300. Network 1350 can be any network or combination of networks (e.g., the Internet, local area network, wide area network, a telephonic network, a cellular network, satellite network, and the like).

Computer device 1305 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 1305 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 1310 can execute under any operating system (OS) (not shown), in a native or virtual environment. One or more applications can be deployed that include logic unit 1360, application programming interface (API) unit 1365, input unit 1370, output unit 1375, and inter-unit communication mechanism 1395 for the different units to communicate with each other, with the OS, and with other applications (not shown). The described units and elements can be varied in design, function, configuration, or implementation and are not limited to the descriptions provided. Processor(s) 1310 can be in the form of hardware processors such as central processing units (CPUs) or in a combination of hardware and software units.

In some example implementations, when information or an execution instruction is received by API unit 1365, it may be communicated to one or more other units (e.g., logic unit 1360, input unit 1370, output unit 1375). In some instances, logic unit 1360 may be configured to control the information flow among the units and direct the services provided by API unit 1365, input unit 1370, output unit 1375, in some example implementations described above. For example, the flow of one or more processes or implementations may be controlled by logic unit 1360 alone or in conjunction with API unit 1365. The input unit 1370 may be configured to obtain input for the calculations described in the example implementations, and the output unit 1375 may be configured to provide output based on the calculations described in example implementations.

In example implementations described herein, the metadata table, relation table index table, flow table, editing flow table, and inference results of FIG. 2 can be held in internal storage 1320 and/or memory 1315 of the management apparatus 1202. Furthermore, data manager 210, data flow manager 220, node similarity calculation model generator 230, data flow recommender 240, and data flow editor 250 can be stored in memory 1315 of management apparatus 1202 to be processed or executed by processor(s) 1310.

In example implementations described herein, there can be a system that recommends the previous and next nodes to be added to a data flow based on metadata and relevance of the data source, nodes similarity with past data flow as illustrated in FIG. 2. Processor(s) 1310 can be configured to facilitate a data flow editing interface for the system of FIG. 2 and as illustrated in FIG. 11, by, for receipt of an input node for an editing data flow in the data flow editing interface, determining a recommendation of a target node and a next node to be added to the data flow based on metadata, relevance of a data source for the data flow, location information of each node on the data flow, and similarity of the editing data flow to past flows that are previously executed data flows: and providing the recommendation of the target node and the next node on the data flow editing interface. As described herein, the target node recommendation procedure can determine the target node based on completeness and complexity.

Depending on the desired implementation, the metadata can involve categories and attributes associated as features for each column for the data source, and correspondence of columns that have a foreign key relationship between data sources/tables as illustrated in FIGS. 3, and 5 to 10(B).

Depending on the desired implementation, the relevance of the data source for the data flow can be determined from the correspondence between the data sources and each nodes of data flows as described in FIGS. 3, 6, 10(A) and 10(B).

Depending on the desired implementation, the location information of each node on the data flow can be determined based on a distance from each of the nodes to a terminal node as illustrated in FIGS. 8(A) and 8(B).

Depending on the desired implementation, the similarity between nodes of the editing data flow and the nodes to the past flows that are the previously executed data flows can be based on a network node similarity model configured to compare similarity of feature vectors of each node on the past flows that are the previously executed data flows to another feature vector of each of the node of the editing data flow as illustrated in FIGS. 2, 5, 7, 8(A) and 8(B).

Depending on the desired implementation, processor(s) 1310 can be configured to determine the recommendation of the target node and the next node on the editing data flow editing interface by calculating completeness of each node on the editing data flow based on the estimate of the prospective number of subsequent nodes; calculating complexity of the each node on the editing data flow based on the metadata of relevant data sources; and determining the target node from the nodes on the editing data flow based on the completeness and the complexity of the nodes on the editing data flow and the next node from the nodes on the past flows that are the previously executed data flows from adjacent nodes of nodes similar to the target node as illustrated in FIG. 6 to FIG. 9. In example implementations described herein, the completeness can be calculated based on the similar node in past flows.

Depending on the desired implementation, processor(s) 1310 can be configured to calculate the completeness of each node on the editing data flow can be based on the location information of similar node on the past flows that are the previously executed data flows as illustrated in FIG. 6 to FIG. 9.

Depending on the desired implementation, processor(s) 1310 can be configured to calculate the complexity based on the indicator (e.g., such as the number of metadata in each column, ID correspondence, the completeness, unit correspondence, and group attribute), wherein the determining the target node and the next node from the nodes on editing data flow based on the complexity is conducted from normalizing the value of each indicator as illustrated in FIGS. 6 to 9.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the techniques of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general-purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the techniques of the present application. Various aspects and/or components of the described example implementations may be used singly or in any combination. It is intended that the specification and example implementations be considered as examples only, with the true scope and spirit of the present application being indicated by the following claims.

The invention claimed is:

1. A method for a data flow editing interface, the method comprising:
for receipt of an input node for an Extract, Transfer, Load (ETL) editing data flow in the data flow editing interface:
   determining a node prediction of a target node and a next node to be added to the data flow in order based on metadata, relevance of a data source for the data flow, location information of each node on the data flow, and similarity of the editing data flow to past flows that are previously executed data flows, wherein the target node is a node to be predicted by the next node; and
providing the node prediction of the target node and the next node on the data flow editing interface,
   wherein determining and providing the node prediction of the target node and the next node reduces data flow creation and are performed without needing to consider input order of the input node,
   wherein the determining the node prediction of the target node and the next node on the editing data flow editing interface comprises:
      calculating completeness of each node on the editing data flow based on an estimate of a prospective number of subsequent nodes;
      calculating complexity of the each node on the editing data flow based on the metadata of relevant data sources, wherein the complexity measures a degree of processing required of the each node; and
      determining the target node from the nodes on the editing data flow based on the completeness and the complexity of the nodes on the editing data flow and the next node from the nodes on the past flows that are the previously executed data flows from adjacent nodes of nodes similar to the target node,
   wherein the calculating the complexity is based on an indicator, the indicator is derived from a number of tags attached to each column, a number of mediate data for joining data sources, the completeness, unit correspondence, group attribute, and associated weight values,
   wherein the determining the target node and the next node from the nodes on editing data flow based on the complexity is conducted from normalizing a value of each indicator.

2. The method of claim 1, wherein the metadata comprises categories and attributes associated as features for each column for the data source, and correspondence of columns that have a foreign key relationship between data sources.

3. The method of claim 1, wherein the relevance of the data source for the data flow is determined from correspondence between the data sources and each node of data flows.

4. The method of claim 1, wherein the location information of each node on the data flow is determined based on a distance from each of the nodes to a terminal node.

5. The method of claim 1, wherein the similarity between nodes of the editing data flow and the nodes to the past flows that are the previously executed data flows is based on a network node similarity model configured to compare similarity of feature vectors of each node on the past flows that are the previously executed data flows to another feature vector of each of the node of the editing data flow.

6. The method of claim 1, wherein the calculating the completeness of each node on the editing data flow is based on the location information of similar node on the past flows that are the previously executed data flows.

7. A non-transitory computer readable medium, storing instructions for a data flow editing interface, the instructions comprising:
for receipt of an input node for an Extract, Transfer, Load (ETL) editing data flow in the data flow editing interface:
determining a node prediction of a target node and a next node to be added to the data flow in order based on metadata, relevance of a data source for the data flow, location information of each node on the data flow, and similarity of the editing data flow to past flows that are previously executed data flows, wherein the target node is a node to be predicted by the next node; and
providing the node prediction of the target node and the next node on the data flow editing interface,
wherein determining and providing the node prediction of the target node and the next node reduces data flow creation and are performed without needing to consider input order of the input node,
wherein the determining the node prediction of the target node and the next node on the editing data flow editing interface comprises:
calculating completeness of each node on the editing data flow based on an estimate of a prospective number of subsequent nodes;
calculating complexity of the each node on the editing data flow based on the metadata of relevant data sources, wherein the complexity measures a degree of processing required of the each node; and
determining the target node from the nodes on the editing data flow based on the completeness and the complexity of the nodes on the editing data flow and the next node from the nodes on the past flows that are the previously executed data flows from adjacent nodes of nodes similar to the target node,
wherein the calculating the complexity is based on an indicator, the indicator is derived from a number of tags attached to each column, a number of mediate data for joining data sources, the completeness, unit correspondence, group attribute, and associated weight values,
wherein the determining the target node and the next node from the nodes on editing data flow based on the complexity is conducted from normalizing the value of each indicator.

8. The non-transitory computer readable medium of claim 7, wherein the metadata comprises categories and attributes associated as features for each column for the data source, and correspondence of columns that have a foreign key relationship between data sources.

9. The non-transitory computer readable medium of claim 7, wherein the relevance of the data source for the data flow is determined from correspondence between the data sources and each node of data flows.

10. The non-transitory computer readable medium of claim 7, wherein the location information of each node on the data flow is determined based on a distance from each of the nodes to a terminal node.

11. The non-transitory computer readable medium of claim 7, wherein the similarity between nodes of the editing data flow and the nodes to the past flows that are the previously executed data flows is based on a network node similarity model configured to compare similarity of feature vectors of each node on the past flows that are the previously executed data flows to another feature vector of each of the node of the editing data flow.

12. The non-transitory computer readable medium of claim 7, wherein the calculating the completeness of each node on the editing data flow is based on the location information of similar node on the past flows that are the previously executed data flows.

13. An apparatus, configured to facilitate a data flow editing interface, the apparatus comprising:
a processor, configured to:
for receipt of an input node for an Extract, Transfer, Load (ETL) editing data flow in the data flow editing interface:
determine a node prediction of a target node and a next node to be added to the data flow in order based on metadata, relevance of a data source for the data flow, location information of each node on the data flow, and similarity of the editing data flow to past flows that are previously executed data flows, wherein the target node is a node to be predicted by the next node; and
provide the node prediction of the target node and the next node on the data flow editing interface,
wherein determining and providing the node prediction of the target node and the next node reduces data flow creation and are performed without needing to consider input order of the input node,
wherein the determining the node prediction of the target node and the next node on the editing data flow editing interface comprises:
calculating completeness of each node on the editing data flow based on an estimate of a prospective number of subsequent nodes;
calculating complexity of the each node on the editing data flow based on the metadata of relevant data sources, wherein the complexity measures a degree of processing required of the each node; and
determining the target node from the nodes on the editing data flow based on the completeness and the complexity of the nodes on the editing data flow and the next node from the nodes on the past flows that are the previously executed data flows from adjacent nodes of nodes similar to the target node,
wherein the calculating the complexity is based on an indicator, the indicator is derived from a number of tags attached to each column, a number of mediate data for joining data sources, the completeness, unit correspondence, group attribute, and associated weight values,
wherein the determining the target node and the next node from the nodes on editing data flow based on the complexity is conducted from normalizing the value of each indicator.

* * * * *